No. 809,840. PATENTED JAN. 9, 1906.
F. S. C. PEISKER.
SHOVEL.
APPLICATION FILED SEPT. 9, 1905.
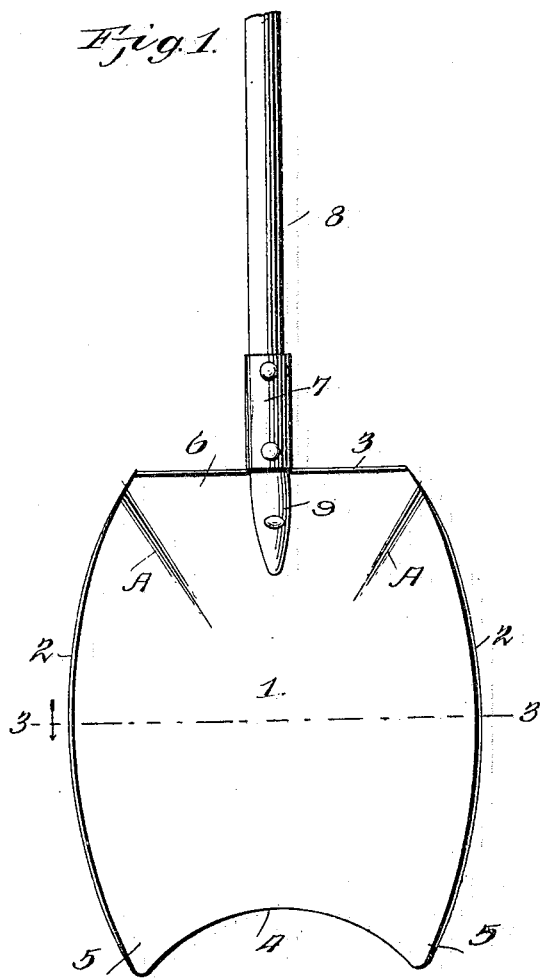
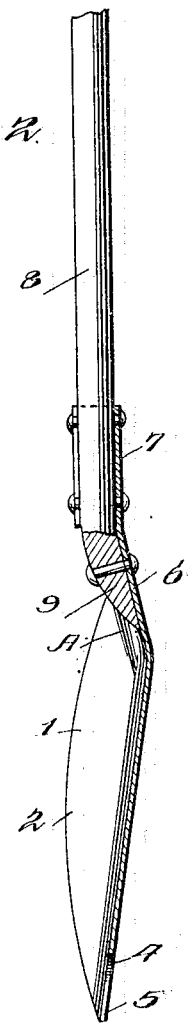
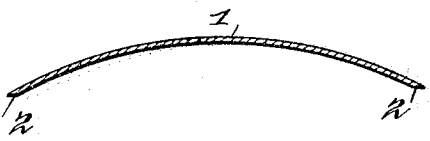
Inventor
F. S. C. Peisker.
Witnesses
Frank Hough
C. C. Hines.
By Victor J. Evans.
Attorney

UNITED STATES PATENT OFFICE.

FREDERICK S. C. PEISKER, OF SAN SABA, TEXAS.

SHOVEL.

No. 809,840.      Specification of Letters Patent.      Patented Jan. 9, 1906.

Application filed September 9, 1905. Serial No. 277,748.

*To all whom it may concern:*

Be it known that I, FREDERICK S. C. PEISKER, a citizen of the United States, residing at San Saba, in the county of San Saba and State of Texas, have invented new and useful Improvements in Shovels, of which the following is a specification.

This invention relates to improvements in shovels, and has for its object to provide a construction of shovel wherein the blade is light, strong, and durable, adapted to accurately balance the load to permit the shovel to be handled with less labor than ordinarily and to also facilitate its entrance into the earth when digging and secure a rapid passage of the load onto the blade in scraping operations. The device is further designed as a combination implement in the carrying out of various kinds of work for which hoes, shovels, and spades are customarily independently used.

The preferred form of the invention is illustrated in the accompanying drawings, in which—

Figure 1 is a front elevation of the shovel. Fig. 2 is a central vertical longitudinal section of the same, and Fig. 3 is a cross-section through the blade on the line 3 3 of Fig. 1.

The blade 1 is of greater length than width and of concavo-convex form, its greatest dish being at the center, where it is also of greatest width. The result of this formation is that the weight of the load will be concentrated at the center and balanced, thus adapting the shovel to be easily handled. The side edges 2 of the blade are convexly curved and beveled to a cutting edge, so that the shovel may be effectively used in edging, sod-cutting, and side-scraping work, the opposite edges extending in convergent relation from the transverse center to the top and bottom edges of the blade. In practice it is preferred to form the blade of sheet metal with its upper edge 3 straight and its lower edge concaved, as shown at 4, the opposite side edges of the concaved portion producing penetrating and gathering wings or points 5. This concaved edge may be used either for digging or scraping purposes and increases the effectiveness of the shovel in collecting the earth, as the wings 5 gather and force the load onto the body of the blade as the latter is thrust downward or forward. Such a form of penetrating end is found peculiarly effective in removing grass from walks and in similar cutting and scraping manipulations and also in securing the entry of the blade into the earth with the expenditure of a relatively small degree of force. The upper end of the blade has a substantially truncate triangular portion 6, of which the edge 3 forms the base, said portion being formed by leaving the upper part of the blade straight and bending the same obliquely to the body of the blade on the inwardly-converging fold-lines A A, whereby such portion is brought to lie between and to be reinforced by the adjacent ends of the curved edges, thus strengthening the blade at the point where the handle is attached. The portion 6 is provided with a suitably-formed socket 7, extending beyond the end 3 to receive the lower end of the handle 8, which is suitably secured therein, the handle being formed with an oblique tang 9, riveted or otherwise fastened to the portion 6. Any other mode of applying the handle may, however, be employed.

In addition to the uses set forth the device may be employed as a sand or grain shovel, as its rapid gathering qualities enable these substances to be easily scooped, while the form of the blade insures their retention.

Having thus fully described the invention, what I claim as new and useful is—

A shovel comprising a dished blade of greater length than width and of maximum width and dish along its central transverse line, the forward edge of the blade being formed with an arcuate concavity and the side edges of the blade being beveled to form cutting edges which converge from the center toward the front and rear edges of the blade, the upper or rear end of the blade having an oblique truncate triangular portion, a socket carried by said triangular portion, and a handle applied to the socket.

In testimony whereof I affix my signature in presence of two witnesses.

FREDERICK S. C. PEISKER.

Witnesses:
    P. H. WALKER,
    TOM WILLIAMS.